(12) United States Patent
Lohbeck

(10) Patent No.: US 6,273,634 B1
(45) Date of Patent: *Aug. 14, 2001

(54) CONNECTOR FOR AN EXPANDABLE TUBING STRING

(75) Inventor: Wilhelmus Christianus Maria Lohbeck, Rijswijk (NL)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,725

(22) Filed: Nov. 13, 1997

(51) Int. Cl.[7] ....................................................... F16B 7/00
(52) U.S. Cl. .......................... 403/297; 403/309; 403/312; 285/404; 285/370; 166/207
(58) Field of Search ..................................... 403/300, 309, 403/310, 311, 312, 313, 306, 297, 277, 362; 285/258, 322, 369, 370, 90, 404; 166/206, 207, 242.7, 242.1, 227

(56) References Cited

U.S. PATENT DOCUMENTS

| | | | |
|---|---|---|---|
| 2,155,370 | * | 4/1939 | Hall et al. ........................ 166/242.1 |
| 3,491,182 | * | 1/1970 | Hunder et al. ................... 403/311 X |
| 3,851,983 | * | 12/1974 | MacKenzie ......................... 403/312 |
| 4,068,346 | * | 1/1978 | Binder ............................. 403/300 X |
| 4,093,389 | * | 6/1978 | Wilbrow ........................... 403/297 X |
| 5,209,599 | * | 5/1993 | Kronenberg ..................... 403/297 X |
| 5,366,012 | * | 11/1994 | Lohbeck ........................... 166/227 X |
| 5,480,196 | * | 1/1996 | Adams, Jr. ....................... 285/370 X |
| 5,667,011 | * | 9/1997 | Gill et al. ......................... 166/207 X |
| 5,901,789 | * | 5/1999 | Donnelly et al. ................ 166/207 X |
| 5,924,745 | * | 7/1999 | Campbell ............................. 285/90 |
| 5,984,568 | * | 11/1999 | Lohbeck ............................. 403/375 |

FOREIGN PATENT DOCUMENTS

| | | | |
|---|---|---|---|
| 239345 | * | 9/1925 | (GB) ..................................... 403/313 |
| WO 94/01460 | | 1/1994 | (WO) . |

* cited by examiner

*Primary Examiner*—Harry C. Kim

(57) ABSTRACT

A connector for interconnecting a pair of adjacent sections of an expandable tubing string includes a plastically expandable sleeve that is arranged co-axially around or inside the ends of the interconnected tubing sections and a series of circumferentially spaced mechanical fasteners, such as screws or rivets, for fastening the sleeve to each of the ends.

12 Claims, 1 Drawing Sheet

CONNECTOR FOR AN EXPANDABLE TUBING STRING

FIELD OF THE INVENTION

The invention relates to a connector for use in connecting sections of an expandable tubing string, and in particular but not exclusively for use in the connection of sections of an expandable slotted tubing (EST) string as utilized in downhole applications in oil and gas production operations.

BACKGROUND TO THE INVENTION

Expandable slotted tubings are known from International patent application No. PCT/EP 93/01460. This reference discloses a slotted tube which may be expanded downhole by running an expansion mandrel through the tubing whereby the slots are expanded to diamond-shaped apertures.

When a tubing is expanded it is desirable that this can be accomplished by a substantially uniform expansion force, also at the locations where adjacent tubing sections are interconnected.

It is therefore an object of the present invention to provide a connector for an expandable tubing that can be expanded smoothly and made up easily without requiring welding operations.

SUMMARY OF THE INVENTION

The connector according to the invention thereto comprises a plastically expandable sleeve that is in use arranged co-axially relative to an end of each of the adjacent tubing sections, and means for fastening the sleeve to said ends.

Preferably the outer surface of an end of each of the adjacent tubing sections has been machined away to form an annular recess in which the sleeve is located.

Alternatively the inner surface of an end of each of the adjacent tubing sections has been machined away to form an annular recess in which the sleeve is located.

It is preferred that the thickness of the sleeve is substantially equal to the depth of the annular recess so that a flush-type connection is created.

It is furthermore preferred that the fastening means comprise a series of circumferentially spaced screws that pass through holes that are drilled through the sleeve and the adjacent wall of ends of the adjacent tubing sections. If desired, the screws may be replaced by rivets or other mechanical fasteners.

The connector according to the invention is particularly attractive for interconnecting sections of an expandable string of oil and/or gas well tubulars that may be slotted. If the connector is used for interconnecting sections of an expandable slotted tubing string then the sleeve is provided with a series of staggered substantially longitudinal slots which are deformable into diamond-shaped apertures upon expansion of the sleeve.

Further aspects, details, objects and advantages of the connector according to the invention will become apparent from the accompanying claims, abstract, drawings and detailed description with reference to the drawings.

DESCRIPTION OF A PREFERRED EMBODIMENT

Figure 1:
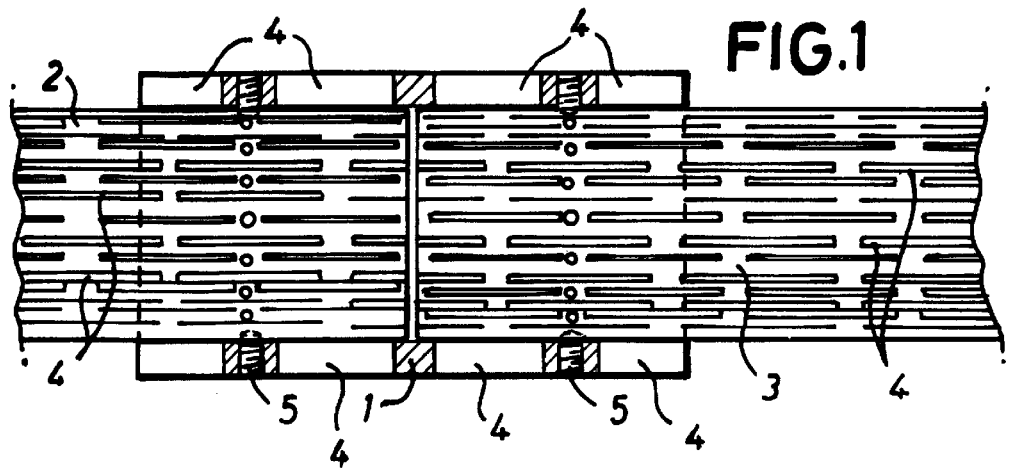
FIG. 1 is a schematic side view of a plastically expandable connector according to the invention which surrounds ends of adjacent expandable slotted tubing sections.

Referring now to FIG. 1, there is shown a connector comprising a plastically deformable slotted sleeve 1 that co-axially surrounds ends of a pair of adjacent slotted tubing sections 2 and 3. The sleeve 1 and tubing sections are each provided with a series of staggered and partially overlapping slots 4 that deform to substantially diamond shaped apertures (not shown) upon expansion of the assembly by e.g. running an expansion mandrel (not shown) through the interior of the tubing sections 2 and 3.

One or more series of circumferentially spaced Allen-type or other locking screws 5 fasten the sleeve 1 to each of the tubing sections 2 and 3 such that the inner surface of the sleeve 1 engages the outer surface of the end of each tubing section 2 and 3 both before, during and after the expansion process. The screws 5 are located in nodes between slots 4.

Figure 2:
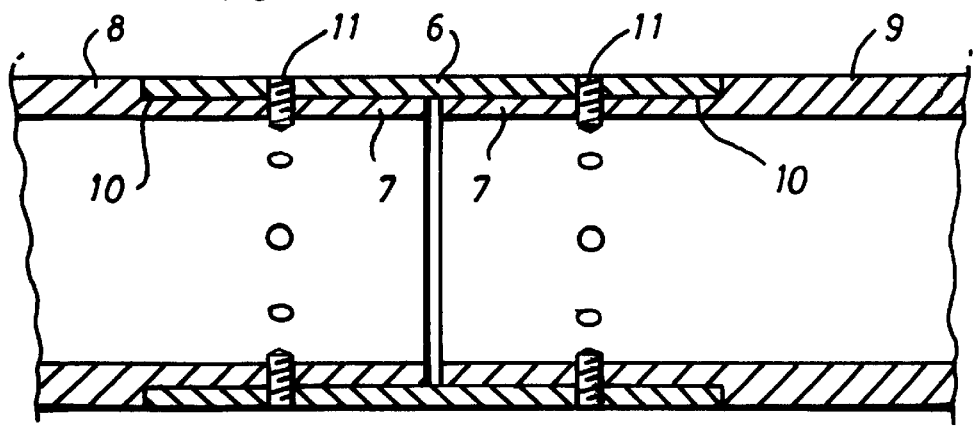
FIG. 2 is a schematic longitudinal sectional view of a flush-type connector according to the invention which surrounds ends of adjacent expandable tubing sections.

Referring now to FIG. 2 there is shown a flush-type connector comprising a plastically deformable solid or slotted sleeve 6 that surrounds ends 7 of adjacent solid or slotted tubing sections 8 and 9, which ends 7 have been machined away to form an annular recess 10 in which the sleeve 6 is located. The thickness of the sleeve 6 substantially equals the depth of the recess 10 to form a flush-type connector.

The connector furthermore comprises a series of circumferentially spaced Allen-type or other locking screws 11 to fasten the sleeve 6 to each of the tubing sections 8 and 9 such that the inner surface of the sleeve 6 engages the outer surface of the ends 7 of the adjacent tubing sections 8 and 9 both before, during and after the expansion process.

Figure 3:
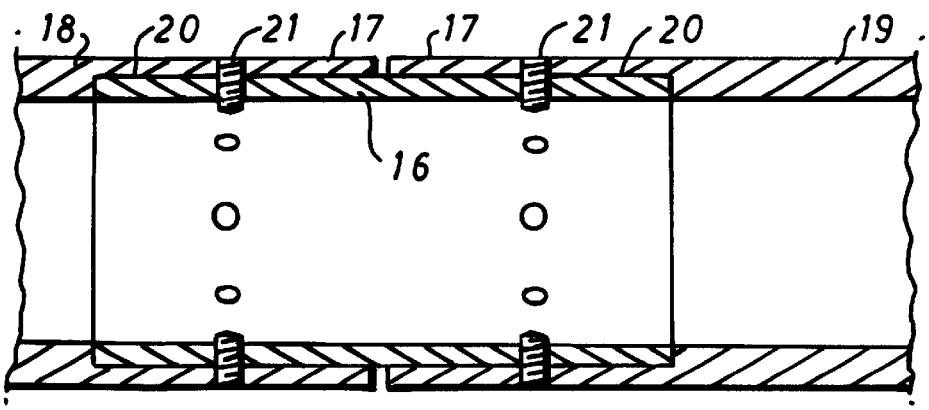
FIG. 3 is a schematic longitudinal sectional view of a flush-type connector according to the invention which is surrounded by ends of adjacent expandable tubing sections.

Referring now to FIG. 3 there is shown a flush-type connector comprising a plastically deformable solid or slotted sleeve 16 that is surrounded by ends 17 of adjacent solid or slotted tubing sections 18 and 19, respectively, which ends 17 have been machined away to form an annular recess 20 in which the sleeve 16 is located. The thickness of the sleeve substantially equals the depth of the recess 20 to form a flush-type connector that smoothly deforms plastically together with the ends of the tubing sections 18 and 19 during the expansion process.

The connector of FIG. 3 furthermore comprises a series of circumferentially spaced Allen-type locking screws 21 to fasten the sleeve 16 to each of the tubing sections 18 and 19 such that the outer surface of the sleeve 16 firmly engages the inner surface of the ends 17 of the adjacent tubing sections 8 and 9 both before, during and after the expansion process.

I claim:

1. A connector for interconnecting adjacent sections of an oil or gas well expandable slotted tubing string, the connector comprising:

a sleeve that is plastically expandable in use arranged co-axially relative to an end of each of the adjacent tubing sections; and fasteners having means to fasten the sleeve to the ends of the adjacent tubing sections; and wherein the sleeve is adapted to interconnect sections of an expandable oil or gas well tubing string and is provided with a series of staggered substantially longitudinal slots which are deformable into diamond-shaped apertures upon expansion of the sleeve.

2. The connector of claim 1, wherein the sleeve is adapted to connect the tubing sections, wherein the outer surface of an end of each of the adjacent tubing sections has been machined away to form an annular recess in which the sleeve is adapted to be located.

3. The connector of claim 2 wherein the thickness of the sleeve is adapted to be substantially equal to the depth of the annular recess.

4. The connector of claim 2 wherein the slots are partially overlapping.

5. The connector of claim 4 wherein the fasteners are Allen-type locking screws effective to engage the connector with each of the tubing sections.

6. The connector of claim 1, wherein the sleeve is adapted to connect the tubing sections, wherein the inner surface of an end of each of the adjacent tubing sections has been machined away to form an annular recess in which the sleeve is adapted to be located.

7. The connector of claim 6 wherein the slots are partially overlapping.

8. The connector of claim 7 wherein the fasteners are Allen-type locking screws effective to engage the connector with each of the tubing sections.

9. The connector of claim 1 wherein the fasteners comprise a series of circumferentially spaced screws adapted to pass through holes that are drilled through the sleeve and the adjacent wall of ends of the adjacent tubing sections.

10. A method to provide a tubular in an oil or gas well, the method comprising the steps of:

providing a connector, the connector comprising: a sleeve that is plastically expandable in use arranged co-axially relative to an end of each of adjacent tubing sections; and fasteners having means to fasten the sleeve to the ends of the adjacent tubing sections; and wherein the sleeve is adapted to interconnect sections of an expandable oil or gas well tubing string;

connecting sections of the tubular with the connector;

placing the connected sections of the tubular in the oil or gas well; and expanding the connected sections of the tubular in the oil or gas well.

11. The method of claim 10 wherein the fasteners are circumferentially spaced screws adapted to pass through holes that are drilled through the sleeve and the adjacent tubing sections.

12. The method of claim 10 wherein the adjacent sections of the tubing string have outer sections machined away to form an annular recess in which the sleeve is located.

* * * * *